United States Patent
Kim

(10) Patent No.: US 11,326,494 B2
(45) Date of Patent: May 10, 2022

(54) SYSTEM AND METHOD FOR CONTROLLING UREA INJECTION FOR SELECTIVE CATALYST REDUCTION

(71) Applicants: Hyundai Motor Company, Seoul (KR); Kia Motors Corporation, Seoul (KR)

(72) Inventor: Min Jae Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/034,414

(22) Filed: Sep. 28, 2020

(65) Prior Publication Data

US 2021/0381416 A1 Dec. 9, 2021

(30) Foreign Application Priority Data

Jun. 3, 2020 (KR) .................. 10-2020-0067216

(51) Int. Cl.
*F01N 3/20* (2006.01)
*F01N 3/08* (2006.01)
*B01D 53/90* (2006.01)

(52) U.S. Cl.
CPC ......... *F01N 3/208* (2013.01); *F01N 3/0842* (2013.01); *B01D 53/90* (2013.01); *B01D 2251/2067* (2013.01); *F01N 2560/026* (2013.01); *F01N 2610/02* (2013.01); *F02D 2200/0406* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,195,987 | B1* | 3/2001 | Miyashita | F01N 3/0842 60/278 |
| 8,875,497 | B2* | 11/2014 | Matsunaga | F01N 3/208 60/295 |
| 2012/0159934 | A1* | 6/2012 | Itoh | F01N 3/208 60/279 |
| 2015/0113985 | A1* | 4/2015 | Kawaguchi | F01N 3/20 60/605.2 |

(Continued)

FOREIGN PATENT DOCUMENTS

| | | |
|---|---|---|
| JP | 3858763 B2 | 12/2006 |
| JP | 4042388 B2 | 2/2008 |
| JP | 4211148 B2 | 1/2009 |

*Primary Examiner* — Binh Q Tran
(74) *Attorney, Agent, or Firm* — Mintz Levin Cohn Ferris Glovsky and Popeo, P.C.; Peter F. Corless

(57) ABSTRACT

Disclosed are a method and system for controlling urea injection for selective catalyst reduction (SCR), capable of improving NOx purification efficiency by predicting an operating situation in which an amount of NOx production is rapidly increased using engine behavior and pre-occluding ammonia in advance. An opening state of an EGR valve may be detected at the time of rapid acceleration of a vehicle; a pressure condition in an intake manifold or an EGR valve pressure condition may be diagnosed according to the opening state of the EGR valve; and urea may be injected when the pressure condition meets an NOx excess production condition of rapidly increasing the amount of NOx production.

5 Claims, 5 Drawing Sheets

(56) References Cited

U.S. PATENT DOCUMENTS

2016/0084185 A1\* 3/2016 Theis ................ F02D 41/1461
  701/105
2016/0131006 A1\* 5/2016 Kurtz .................. F01N 3/2066
  60/274

\* cited by examiner

SYSTEM AND METHOD FOR CONTROLLING UREA INJECTION FOR SELECTIVE CATALYST REDUCTION

CROSS REFERENCE TO RELATED APPLICATION

The present application claims priority to Korean Patent Application No. 10-2020-0067216, filed Jun. 3, 2020, the entire contents of which is incorporated herein for all purposes by this reference.

TECHNICAL FIELD

The present invention relates to a method and system for controlling urea injection for selective catalyst reduction (SCR), capable of improving NOx purification efficiency by predicting an operating situation in which an amount of NOx is rapidly increased using an engine behavior and pre-occluding ammonia.

BACKGROUND

In an SCR system, when urea is injected at a front end of a catalyst, urea is mixed with a hot exhaust gas and thermally decomposed and hydrolyzed so as to be converted into ammonia $NH_3$, and ammonia is pre-occluded to the catalyst. Therefore, as NOx contained in the exhaust gas passes through the catalyst, reduction reaction occurs with ammonia to change NOx into water and nitrogen, thereby reducing NOx.

Accordingly, the SCR system calculates an equivalent of ammonia required to reduce an NOx inflow measured by an NOx sensor, and an amount of ammonia required for reduction is equal to the amount of pre-occluded ammonia being consumed. That is, urea is injected as much as the amount of consumed pre-occluded ammonia to fill the space again.

The amount of pre-occluded ammonia is determined based on experimental results of a developer. However, the amount of pre-occluded ammonia of the related art has a structural limitation in that it is inevitably determined by results evaluated under stable conditions and verification easy conditions (e.g., SCR temperature of 250° C., exhaust flow rate of 300 kg/h). For example, the amount of pre-occluded ammonia is determined by considering an exhaust flow rate but there is a problem in that a change in the exhaust flow rate (gradient) is not considered. In case of a situation in which an exhaust flow rate changes rapidly due to acceleration/deceleration of a vehicle, there is no method for adjusting an amount of pre-occluded ammonia, leading to a problem of a continuous occurrence of a phenomenon that purification efficiency is instantaneously deteriorated.

First, when a sudden change in the exhaust flow rate decreases the purification efficiency of the SCR and when the vehicle is suddenly accelerated, an EGR valve is instantaneously closed as intake air volume supercharge performance significantly falls short of a target value required by the developer, and in this case, an EGR gas cannot be supplied into a combustion chamber, increasing an exhaust temperature to increase NOx flowing into the SCR to degrade purification efficiency of the SCR.

Second, when the EGR valve is fully opened as a flow of the EGR gas is stagnated or flow backward due to insufficient differential pressure between front and rear ends of the EGR valve, and the EGR valve is completely opened, an exhaust flow rate increases as shown in FIG. 1 to increase temperature, and as a result, NOx flowing into the SCR can increase rapidly, degrading the purification efficiency of the SCR.

Further, when the NOx sensor detects excessive NOx inflow, urea may be injected to increase the amount of pre-occluded ammonia. However, at the time of detecting the excessive NOx inflow by the NOx sensor, the exhaust gas has already passed through the SCR before ammonia is occluded to the catalyst because an interval between the NOx sensor and the SCR is too short, thus degrading the purification efficiency of the SCR.

The contents described as the related art have been provided only to assist in understanding the background of the present invention and should not be considered as corresponding to the related art known to those having ordinary skill in the art.

SUMMARY

In preferred aspects, provided are, inter alia, a method and system for controlling urea injection for selective catalyst reduction (SCR), capable of improving NOx purification efficiency by predicting an operating situation in which the amount of NOx production is rapidly increased using engine behavior and pre-occluding ammonia in advance.

In an aspect, provided is a method for controlling urea injection for selective catalyst reduction (SCR). The method includes: detecting an opening state, by a controller, an opening state of an EGR valve at the time of rapid acceleration of a vehicle; diagnosing, by the controller, a pressure condition in an intake manifold or an EGR valve pressure condition according to the opening state of the EGR valve; and injecting, by the controller, urea when the pressure condition meets an NOx excess production condition of rapidly increasing an amount of NOx production.

In the diagnosing the pressure condition, when the EGR valve is in a fully closed state, a target boost pressure in the intake manifold and an actual boost pressure may be compared with each other.

In the injecting the urea, the NOx excess production condition may be met if the target boost pressure is greater than the actual boost pressure and a difference between the target boost pressure and the actual boost pressure is greater than a set value.

In the injecting the urea, an NOx model determined by a sensing value of an oxygen sensor may be corrected by multiplying an additional amount of NOx production determined by a fully closed state of the EGR valve and a boost pressure difference value, and an amount of urea injection may be determined based on the corrected NOx model.

In the diagnosing the pressure condition, a pressure at a front end of the EGR valve and a pressure at a rear end of the EGR valve may be compared when the EGR valve is in the fully opened state.

In the injecting the urea, the NOx excess production condition may be met if the pressure at the rear end of the EGR valve is greater than the pressure at the front end of the EGR valve.

In the injecting the urea, an NOx model determined by a sensing value of an oxygen sensor may be corrected by multiplying an additional amount of NOx production determined by a fully opened state of the EGR valve and a pressure difference value between the front and rear ends of the EGR valve, and an amount of urea injection may be determined based on the corrected NOx model.

In an aspect, provided is a system for controlling urea injection for selective catalyst reduction (SCR) including: an opening state detector configured to detect an opening state of an EGR valve; a pressure condition diagnoser configured to diagnose a pressure condition in an intake manifold or an EGR valve pressure condition according to the opening state of the EGR valve; and an injection controller configured to inject urea when the pressure condition meets an NOx excess production condition of rapidly increasing an amount of NOx production.

Further provided is a vehicle that may include the system for controlling urea injection for selective catalyst reduction (SCR) described herein.

Other aspects of the invention are disclosed infra.

DETAILED DESCRIPTION OF THE EMBODIMENTS

Hereinafter, embodiments of the present invention is described with reference to the accompanying drawings.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
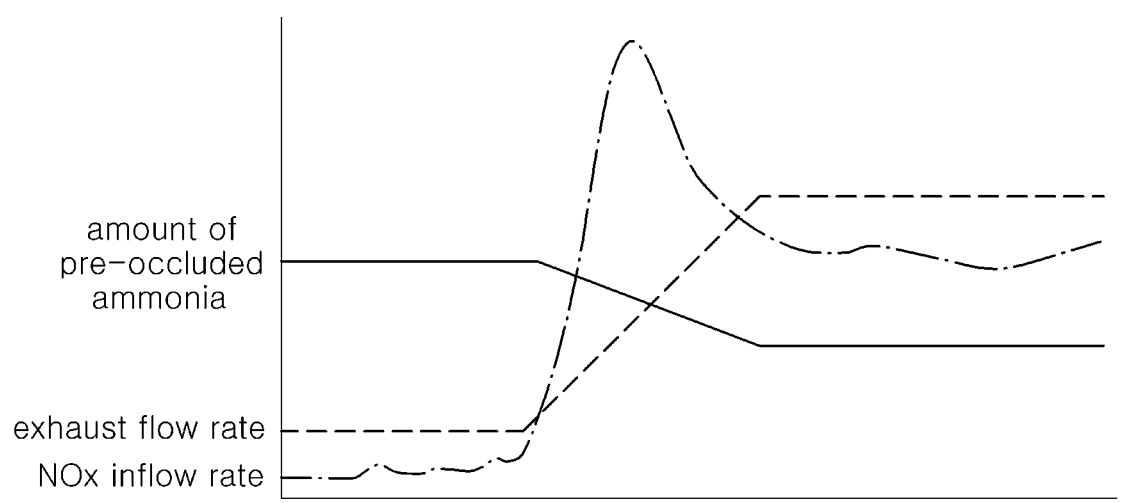
FIG. 1 is a view illustrating a relationship between an NOx inflow rate and pre-occluded ammonia amount according to an exhaust flow rate.
Figure 2:
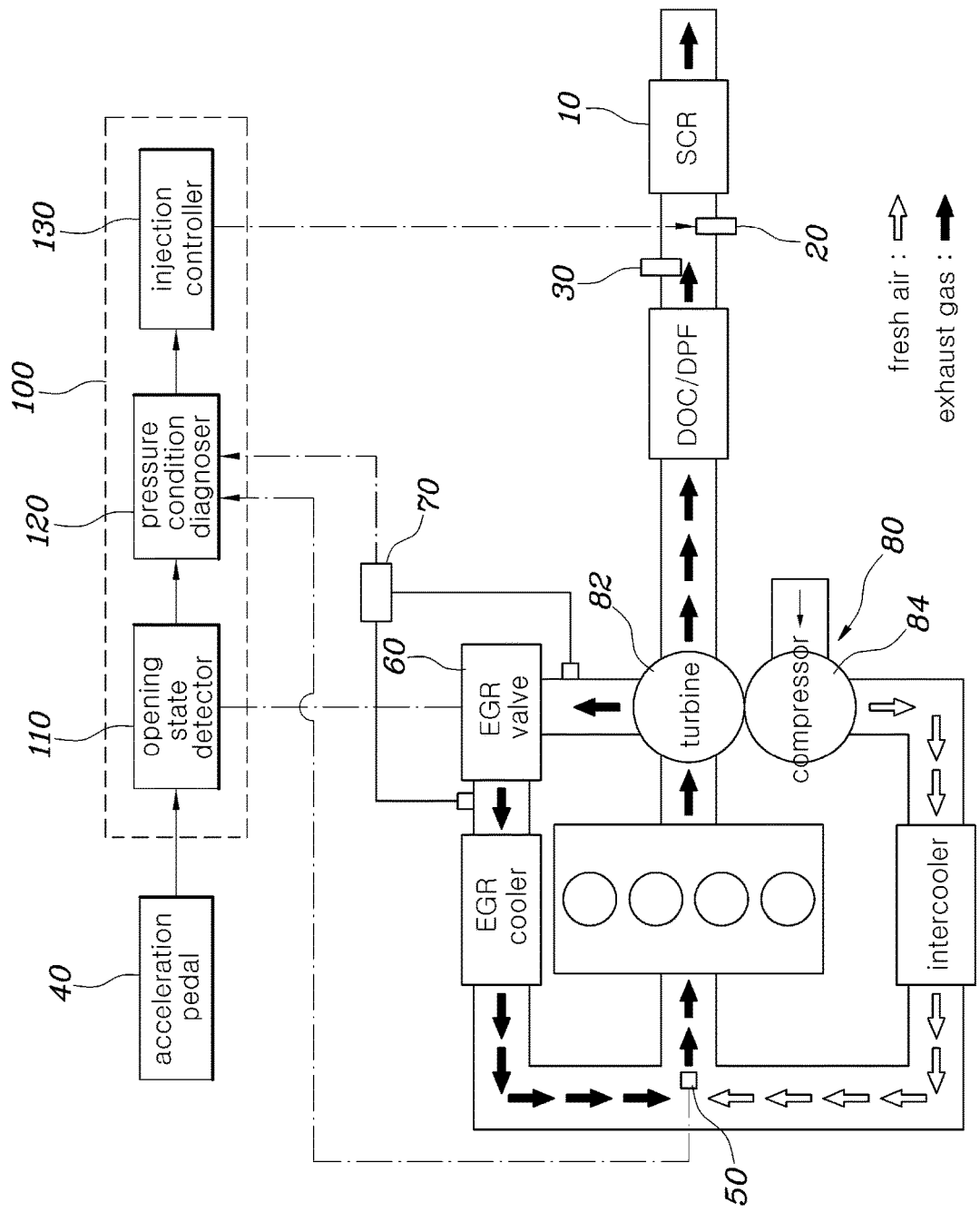
FIG. 2 shows an exemplary system for controlling urea injection according to an exemplary embodiment of the present invention.

FIG. 2 is a view schematically illustrating a system for controlling urea injection according to the present invention.

As shown in FIG. 2, fresh air and EGR gas may be introduced into an intake manifold provided at a front end of an engine, and a boost pressure sensor 50 may be mounted in the intake manifold to detect pressure in the intake manifold.

An EGR line may be branched from a middle of an exhaust line connected to a rear end of a turbine 82 of a turbocharger 80, and an EGR valve 60 may be mounted on the EGR line to adjust a flow rate of the EGR gas. Also, an EGR differential pressure sensor 70 may be installed to detect a pressure difference between a front end (inlet side) and a rear end (outlet side) of the EGR valve 60. Reference numeral 84 denotes a compressor of the turbocharger.

In addition, an exhaust gas reduction device such as DOC and DPF may be installed on the exhaust line connected to the rear end of the turbine 82.

An NOx sensor 30 may be installed at a rear end of the exhaust gas reduction device to detect an amount of NOx, an urea injection port 20 may be installed at a rear end of the NOx sensor 30 to inject urea, and an SCR 10 that reduces NOx by pre-occluding ammonia may be installed at a rear end of the urea injection port 20. The urea injection port 20 may be a dosing module serving to inject urea.

In addition, a controller 100 according to the present invention may include an opening state detector 110, a pressure condition diagnoser 120 and an injection controller 130.

First, the opening state detector 110 may detect an opening state of the EGR valve 60 when the vehicle is rapidly accelerated. For example, the opening state detector 110 determines whether the EGR valve 60 is opened or closed by measuring an opening amount of the EGR valve 60.

The pressure condition diagnoser 120 may diagnose a pressure condition of the intake manifold or a pressure condition of the EGR valve 60 upon receiving sensing values from the boost pressure sensor 50 and the EGR differential pressure sensor 70 according to the opening degree of the EGR valve 60.

When the pressure condition meets an NOx excess production condition in which an amount of NOx production is rapidly increased, the injection controller 130 may control to inject urea by applying an injection command to the urea injection port 20.

That is, in the related art, urea is not injected from the urea injection port 20 to pre-occlude ammonia to the SCR 10 until fresh air and exhaust gas pass through the turbine 82 and reach the NOx sensor 30 and an NOx value is measured.

However, in the case of an operating condition in which the amount of NOx rapidly increases, if urea is injected after a NOx value is measured through the NOx sensor 30, timing for pre-occluding ammonia is late because an exhaust gas containing NOx has already passed through the SCR 10.

Thus, according to exemplary embodiments of the present invention, the operating situation in which the amount of NOx increases rapidly can be predicted by diagnosing the state of the boost pressure sensor 50 and the EGR valve 60, and urea may be injected when a rapid increase in the amount of NOx is predicted. As such, a chemical phase change process in which urea is thermally decomposed and hydrolyzed to ammonia may be ensured to pre-occlude ammonia to the SCR 10, thereby improving NOx purification efficiency despite the rapid increase in NOx production amount.

Meanwhile, a method for controlling urea injection for SCR 10 according to an exemplary embodiment of the present invention may include detecting an opening state, diagnosing a pressure condition, and injecting urea, each of these steps may be controlled through the controller 100.

The controller 100 according to an exemplary embodiment of the present invention may be realized through a non-volatile memory (not shown) configured to store data relating to an algorithm configured to control operations of various components of a vehicle or software instructions for reproducing the algorithm and a processor (not shown) configured to perform operations described hereinafter using the data stored in the corresponding memory. Here, the memory and the processor may be realized as separate chips. Alternatively, the memory and processor may be realized as an integrated single chip. The processor may be in the form of one or more processors.

Thus, referring to the configuration of each step, first, in the opening state detection step, the controller 100 detects an opening state of the EGR valve 60 when the vehicle is rapidly accelerated.

Here, whether the vehicle is rapidly accelerated may be determined by analyzing an opening amount of an acceleration pedal 40. For example, if a rate of change in which a depression amount (opening amount) of the accelerating pedal 40 increases is greater than about 50%, it may be determined as a rapid acceleration situation.

In diagnosing the pressure condition, the controller 100 may diagnose a pressure condition in the intake manifold or a pressure condition of the EGR valve 60 according to the opening state of the EGR valve 60.

In the injecting the urea, the controller 100 may control to inject urea if the pressure condition meets a NOx peak condition of rapidly increasing the amount of NOx production.

Figure 3:
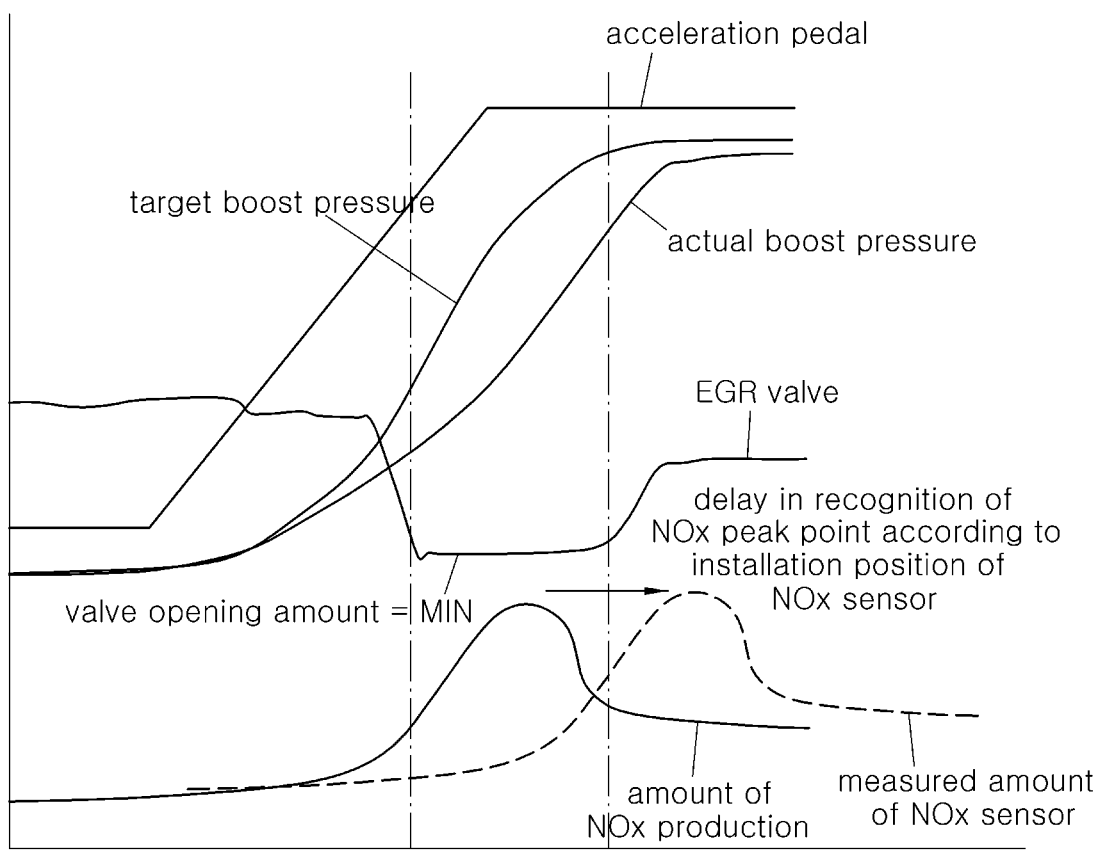
FIG. 3 shows an exemplary engine behavior in a situation in which an NOx production amount is rapidly increased through a boost pressure diagnosis according to an exemplary embodiment of the present invention.

FIG. 3 shows an exemplary engine behavior in a situation in which the amount of NOx production rapidly increases through a boost pressure diagnosis in the present invention.

As shown in FIG. 3, in the diagnosing the pressure condition, when the opening amount of the EGR valve 60 is minimized and the EGR valve 60 is fully closed, a target boost pressure in the intake manifold and an actual boost pressure may be compared using the boost pressure sensor 50.

Thus, in the injecting the urea, if the target boost pressure is greater than the actual boost pressure and a difference between the target boost pressure and the actual boost pressure is greater than a set value, it may be determined that the NOx excess production condition is met.

That is, when the vehicle is rapidly accelerated, if the actual boost pressure is insufficient due to lack of supercharging efficiency, a phenomenon that the EGR valve 60 is closed occurs.

Thus, when the NOx excess production condition is met according to comparison between the actual boost pressure and the target boost pressure, urea may be injected, whereby urea may be injected in advance before an NOx production peak timing is measured by the NOx sensor 30.

Accordingly, by increasing the amount of ammonia pre-occluded to the SCR 10 may be increased before the excessively produced NOx passes through the SCR 10, the amount of NOx passing through the SCR 10 without a reduction reaction is reduced, thereby improving the efficiency of NOx purification.

In addition, the amount of injected urea may be determined based on the state of the EGR valve 60 and the boost pressure.

In particular, in the injecting the urea, an NOx model determined by a sensing value of an oxygen sensor may be corrected by multiplying the NOx model by an additional amount of NOx production determined by a fully closed state of the EGR valve 60 and the difference value of the boost pressure.

The amount of urea injected may be determined based on the corrected NOx model.

That is, if a situation in which the amount of NOx production is excessive is predicted, the amount of NOx production may be predicted and the NOx model is corrected to reflect the predicted amount of NOx production, thereby additionally injecting urea only as much as possible to purify NOx. Therefore, the injection amount of urea may be reduced by preventing unnecessary urea injection.

Figure 4:
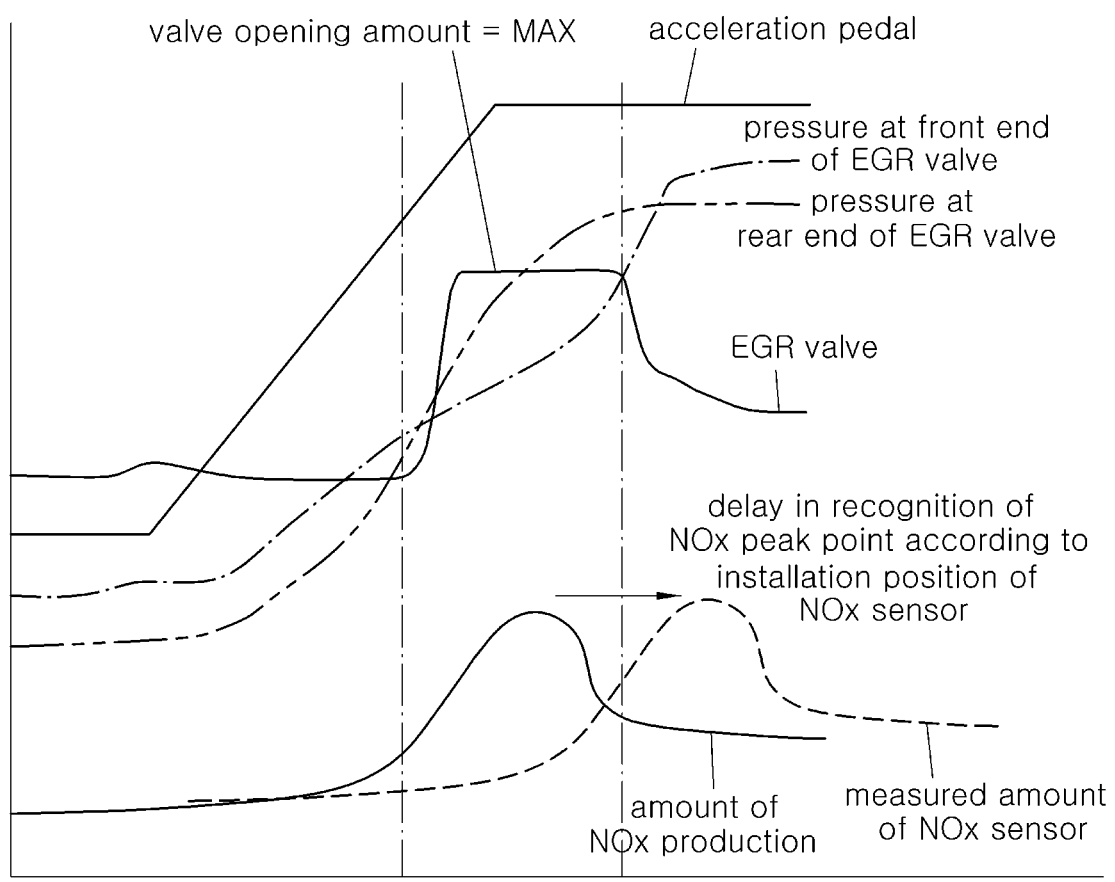
FIG. 4 shows an engine behavior in a situation in which the NOx production amount rapidly increases through a pressure diagnosis at front and rear ends of an EGR valve in the present invention.

Meanwhile, FIG. 4 shows an engine behavior in a situation that the amount of NOx production rapidly increases through diagnosis of pressure at the front and rear ends of the EGR valve 60 according to an exemplary embodiment of the present invention.

As shown in FIG. 4, in the diagnosing the pressure condition, when the opening amount of the EGR valve 60 may be maximized and the EGR valve 60 is fully opened, pressure at the front end of the EGR valve 60 and pressure at the rear end of the EGR valve 60 may be compared.

Accordingly, in the injecting the urea, if the target pressure at the rear end (outlet) of the EGR valve 60 is greater than the pressure at the frontend (inlet) of the EGR valve 60, it is determined that the NOx excess production condition is met.

That is, when the vehicle is rapidly accelerated, if a differential pressure between the front and rear ends of the EGR valve 60 is insufficient, a phenomenon occurs in which the EGR valve 60 is opened.

Thus, when the condition in which the amount of NOx production is excessive is met by comparing the differential pressure between the front and rear ends of the EGR valve 60, urea may be injected. As such, urea may be injected in advance before the NOx production peak timing is measured by the NOx sensor 30.

Accordingly, by increasing the amount of ammonia pre-occluded to the SCR 10 may be increased before the excessively produced NOx passes through the SCR 10, the amount of NOx passing through the SCR 10 is reduced without a reduction reaction, thereby improving the efficiency of NOx purification.

In addition, the amount of injected urea may be determined based on the state of the EGR valve 60 and the pressure at the front and rear ends of the EGR valve 60.

In particular, in the injecting the urea, an NOx model determined by a sensing value of an oxygen sensor may be corrected by multiplying the NOx model by an additional amount of NOx production determined by a fully opened state of the EGR valve and the difference value of the front and rear ends of the EGR valve 60.

Also, an additional injection amount of urea may be determined based on the corrected NOx model.

That is, if a situation in which the amount of NOx production is excessive is predicted, the amount of NOx production may be predicted and the NOx model may be corrected to reflect the predicted amount of NOx production, thereby additionally injecting urea only as much as possible to purify NOx. Therefore, the injection amount of urea may be reduced by preventing unnecessary urea injection.

Figure 5:
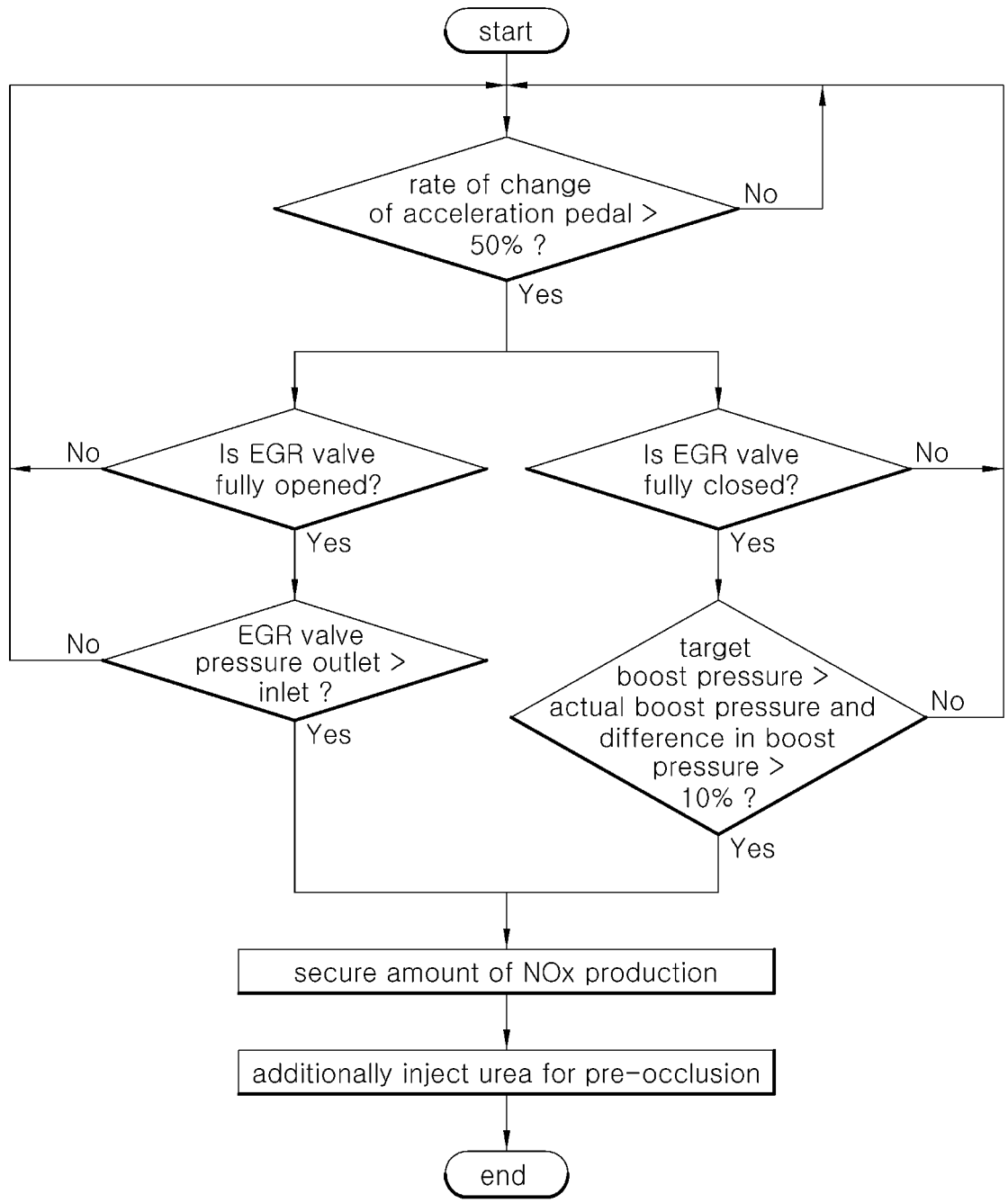
FIG. 5 is a flowchart illustrating an exemplary overall urea injection control process according to an exemplary embodiment of the present invention.

FIG. 5 shows an exemplary overall urea injection control process according to an exemplary embodiment of the present invention.

As shown in FIG. 5, the acceleration pedal 40 may be monitored during a driving process of the vehicle to determine whether the vehicle is rapidly accelerated (S10).

For example, when a rate of change in a depression amount of the acceleration pedal 40 is greater than about 50%, it is determined as a rapid acceleration situation.

Thus, at the time of determining rapid acceleration of the vehicle, an opening state of the EGR valve 60 may be determined by diagnosing am opening amount of the EGR valve 60.

For example, it may be determined whether the EGR valve 60 is fully closed or fully opened (S20, S40).

When the EGR valve 60 is determined to be fully closed in step S20 as a result of the determination, if the target boost pressure is greater than the actual boost pressure and a difference between the actual boost pressure and the target boost pressure is greater than about 10% (S30), it may be determined as an operating condition in which NOx is excessively produced.

Accordingly, a correction amount may be calculated based on the boost pressure and the closed state of the EGR valve 60, and the NOx model may be corrected by reflecting the calculated amount of correction in the NOx model, thereby detecting an NOx inflow rate (S60).

Subsequently, by the injecting the urea to reduce the detected amount of NOx, the amount of ammonia pre-occluded to the SCR 10 may be increased, thereby improving the purification efficiency of the SCR 10 (S70).

In addition, as a result of the determination in step S40, when it is determined that the EGR valve 60 is fully opened and if the pressure at the rear end of the EGR valve 60 is greater than the pressure at the front end of the EGR valve 60 (S50), it may be determined that NOx is excessively produced.

Thus, since the correction amount is calculated based on the differential pressure of the EGR valve 60 and the open state of the EGR valve 60, and the calculated correction amount may be reflected in the NOx model to correct the NOx model, thereby detecting the NOx inflow rate (S60).

Subsequently, by additionally injecting urea to reduce the detected NOx amount, the amount of ammonia pre-occluded to the SCR 10 may be increased, thereby improving the purification efficiency of the SCR 10 (S70).

As described above, according to various exemplary embodiments of the present invention, an operating situation in which the NOx amount is rapidly increased can be predicted by diagnosing states of the boost pressure sensor 50 and the EGR valve 60 and urea may be injected when a rapid increase in the NOx amount is predicted. As such, a chemical phase change process in which urea is thermally decomposed and hydrolyzed to ammonia is ensured to pre-occlude ammonia to the SCR 10. Therefore, efficiency of NOx purification may be improved despite a rapid increase in NOx production.

In the present invention through the solution described above, an operating situation in which the NOx amount is rapidly increased can be predicted by diagnosing a state of the boost pressure sensor and the EGR valve and urea is additionally injected when a rapid increase in the NOx amount is predicted. As such, a chemical phase change process in which urea is thermally decomposed and hydrolyzed to ammonia can be ensured to pre-occlude ammonia to the SCR. Therefore, efficiency of NOx purification may be improved despite a rapid increase in NOx production.

Although the present invention has been shown and described with respect to exemplary embodiments, it will be apparent to those having ordinary skill in the art that the present invention may be variously modified and altered without departing from the spirit and scope of the present invention as defined by the following claims.

What is claimed is:

1. A method for controlling urea injection for selective catalyst reduction (SCR), comprising:
   detecting, by a controller, an opening state of an EGR valve at the time of rapid acceleration of a vehicle;
   diagnosing, by the controller, a pressure condition in an intake manifold or an EGR valve pressure condition according to the opening state of the EGR valve; and
   injecting, by the controller, urea when the pressure condition meets an NOx excess production condition of increasing an amount of NOx production,
   wherein, in the diagnosing the pressure condition, when the EGR valve is in a fully closed state, a target boost pressure in the intake manifold and an actual boost pressure are compared with each other, and
   wherein, in the injecting the urea, the NOx excess production condition is met if the target boost pressure is greater than the actual boost pressure and a difference between the target boost pressure and the actual boost pressure is greater than a set value.

2. The method of claim 1, wherein, in injecting the urea, an NOx model determined by a sensing value of an oxygen sensor is corrected by multiplying an additional amount of NOx production determined by a fully closed state of the EGR valve and a boost pressure difference value, and an amount of urea injection is determined based on the corrected NOx model.

3. The method of claim 1, wherein, in the diagnosing the pressure condition, a pressure at a front end of the EGR valve and a pressure at a rear end of the EGR valve are compared when the EGR valve is in a fully opened state.

4. The method of claim 3, wherein, in the injecting the urea, the NOx excess production condition is met if the pressure at the rear end of the EGR valve is greater than the pressure at the front end of the EGR valve.

5. The method of claim 4, wherein, in the injecting the urea, an NOx model determined by a sensing value of an oxygen sensor is corrected by multiplying an additional amount of NOx production determined by the fully opened state of the EGR valve and a pressure difference value between the front and rear ends of the EGR valve, and an amount of urea injection is determined based on the corrected NOx model.

* * * * *